(12) United States Patent
Saitou et al.

(10) Patent No.: US 7,921,676 B2
(45) Date of Patent: Apr. 12, 2011

(54) METHOD FOR MANUFACTURING OPTICAL FIBER PREFORM AND OPTICAL FIBER PREFORM APPARATUS

(75) Inventors: Manabu Saitou, Sakura (JP); Shunichirou Hirafune, Sakura (JP)

(73) Assignee: Fujikura Ltd., Tokyo (JP)

( * ) Notice: Subject to any disclaimer, the term of this patent is extended or adjusted under 35 U.S.C. 154(b) by 1050 days.

(21) Appl. No.: 11/312,363

(22) Filed: Dec. 21, 2005

(65) Prior Publication Data
US 2006/0117801 A1    Jun. 8, 2006

Related U.S. Application Data

(63) Continuation of application No. PCT/JP2004/009229, filed on Jun. 23, 2004.

(30) Foreign Application Priority Data

Jun. 25, 2003    (JP) .................................. 2003-181365

(51) Int. Cl.
*C03B 37/01* (2006.01)
*C03B 37/014* (2006.01)
*C03B 37/018* (2006.01)

(52) U.S. Cl. ................. 65/426; 65/422; 65/424; 65/157

(58) Field of Classification Search ..................... 65/422, 65/424, 426; 34/77, 78, 79, 80, 472
See application file for complete search history.

(56) References Cited

U.S. PATENT DOCUMENTS

| | | | |
|---|---|---|---|
| 5,114,338 A | | 5/1992 | Tsuchiya et al. |
| 5,259,856 A | * | 11/1993 | Ohga et al. ........................ 65/426 |
| 6,053,013 A | * | 4/2000 | Oh et al. ........................... 65/412 |
| 6,131,415 A | | 10/2000 | Chang et al. |
| 2002/0007374 A1 | | 1/2002 | Marks et al. |
| 2002/0029592 A1 | * | 3/2002 | Yamazaki et al. ............... 65/424 |
| 2002/0073741 A1 | | 6/2002 | Ishida |
| 2004/0007186 A1 | * | 1/2004 | Saito ............................ 118/724 |
| 2005/0155390 A1 | | 7/2005 | Nagasu et al. |

FOREIGN PATENT DOCUMENTS

| | | |
|---|---|---|
| JP | 57-17433 A | 1/1982 |
| JP | 01-145346 A | 6/1989 |
| JP | 230635 | 2/1990 |
| JP | 2-196045 A | 8/1990 |

(Continued)

OTHER PUBLICATIONS

Trechsel, Heinz R. Moisture Control in Buildings: (MNL 18). ASTM International, 1994. p. 91.*

(Continued)

*Primary Examiner* — Khanh Nguyen
*Assistant Examiner* — Carson Gross
(74) *Attorney, Agent, or Firm* — Sughrue Mion, PLLC

(57) ABSTRACT

A method for manufacturing an optical fiber preform and an optical fiber preform apparatus are provided which can reduce hydroxyl groups in an optical fiber preform to a sufficient level without requiring any special equipment or operating conditions. When an optical fiber preform is manufactured by the vapor-phase deposition method, the dehydrating treatment is performed on a porous core preform that is obtained by deposing glass microparticles. In this treatment, a dehydrating agent is supplied to a dehydration apparatus through a feeding pipe and a main feeding pipe made of a material having a water permeance factor of $1.0 \times 10^{-11}$ g·cm/cm$^2$·s·cmHg or less, thereby manufacturing an optical fiber preform.

13 Claims, 2 Drawing Sheets

FOREIGN PATENT DOCUMENTS

| | | |
|---|---|---|
| JP | 5-37928 U | 5/1993 |
| JP | 05-301720 A | 11/1993 |
| JP | 11-171575 A | 6/1999 |
| JP | 2000-159532 A | 6/2000 |
| JP | 2000-256029 A | 9/2000 |
| JP | 2001-072431 A | 3/2001 |
| JP | 2002-187733 A | 7/2002 |
| JP | 2005-225747 A | 8/2005 |

OTHER PUBLICATIONS

Nayyar, Mohinder L. Piping Handbook (7$^{th}$ Edition). ©2000 McGraw-Hill.*

Willoughby, David A. Plastic Piping Handbook. ©2002 McGraw-Hill.*

International Search Report.

* cited by examiner

METHOD FOR MANUFACTURING OPTICAL FIBER PREFORM AND OPTICAL FIBER PREFORM APPARATUS

This is a continuation application based on PCT Application No. PCT/JP2004/009229 filed Jun. 23, 2004, which claims priority to JP 2003-181365 filed Jun. 25, 2003, the contents of which are incorporated herein by reference.

BACKGROUND ART

The present invention relates to a method for manufacturing an optical fiber preform and an apparatus therefor which can manufacture optical fibers exhibiting a reduced transmission loss caused by hydroxyl groups in the region of wavelengths between 1280 nm and 1600 nm.

Hydroxyl groups that are present in glass used in forming optical fiber cause absorption in the wavelength vicinity of 1385 nm, which is one of the causes of transmission loss of the optical fibers.

For this reason, conventionally, a dehydration step has been used in the process for manufacturing an optical fiber preform to reduce hydroxyl groups contained in optical fiber preforms, as taught in Japanese Patent Application, First Publication No. S57-17433.

This dehydration method includes placing a porous glass preform obtained by vapor-phase deposition methods, such as the VAD method or the OVD method, in a dehydration apparatus; supplying a dehydrating agent containing a chlorine-based compound gas, such as $Cl_2$, $SOCl_2$, or $CCl_4$, to this dehydration apparatus; and heating the optical fiber preform at about 1000° C.-1300° C. to remove water absorbed in the porous glass.

However, the effect of dehydration by this conventional dehydration method may be insufficient, and an improvement thereof has been desired.

Such improvements include, for example, methods disclosed in Japanese Patent Application, First Publication No. H11-171575 and Japanese Patent Application, First Publication No. 2002-187733.

However, these methods have shortcomings and are less practical since these methods require special equipment, such as a plasma etching apparatus, for example, or these methods make it difficult to manufacture a large optical fiber preform, or these methods entail complex operating conditions.

Furthermore, other than the above-identified technique, there are a number of related art patents relating to such a dehydrating treatment of optical fiber preforms, including those disclosed in U.S. Pat. No. 6,131,415 and U.S. Patent Application, Publication No. 2002-0073741.

Accordingly, the present invention provides a method for manufacturing an optical fiber preform and an apparatus therefor which can reduce hydroxyl groups in an optical fiber preform to a sufficient level without requiring any special equipment or operating conditions.

DISCLOSURE OF THE INVENTION

In order to solve the above-identified problems, one aspect is a method for manufacturing an optical fiber preform comprising providing a porous glass preform obtained by a vapor-phase deposition method, and performing a dehydration treatment using a dehydrating agent, wherein the dehydration treatment is performed using the dehydrating agent supplied through a pipe having a water permeance factor of $1.0 \times 10^{-11}$ g·cm/cm²·s·cmHg or less at 40° C. (hereinafter, this value is that measured at 40° C.).

Another aspect is the method for manufacturing an optical fiber preform, wherein ambient humidity, where the pipe having the water permeance factor of $1.0 \times 10^{-11}$ g·cm/cm²·s·cmHg or less is present, is maintained at 40% or less.

Another aspect is the method for manufacturing an optical fiber preform, wherein the dehydrating agent is supplied together with a carrier gas having a dew point of −85° C. or less.

Another aspect is the method for manufacturing an optical fiber preform, wherein an inert gas having a dew point of −90° C. or less is further supplied.

Another aspect is the method for manufacturing an optical fiber preform, wherein an outside of the pipe having the water permeance factor of $1.0 \times 10^{-11}$ g·cm/cm²·s·cmHg or less through which the dehydrating agent flows is surrounded by a spacing, and a gas having a dew point of −80° C. or less is flowed through the spacing.

Another aspect is the method for manufacturing an optical fiber preform, wherein the gas having a dew point of −80° C. or less that is flowed through the spacing is a gas containing at least one gas selected from the group consisting of air, nitrogen, oxygen, carbon dioxide, argon, and helium.

Another aspect is an apparatus for manufacturing an optical fiber preform, comprising: a dehydration apparatus that dehydrates using a dehydrating agent; a porous glass preform obtained by a vapor-phase deposition method; and a pipe for supplying the dehydrating agent to the dehydration apparatus, the pipe having a water permeance factor of $1.0 \times 10^{-11}$ g·cm/cm²·s·cmHg or less.

Another aspect is the apparatus for manufacturing an optical fiber preform, wherein the pipe having the water permeance factor of $1.0 \times 10^{-11}$ g·cm/cm²·s·cmHg or less is constructed so that a product of the water permeance factor of the pipe and a surface area of the pipe is maintained at $1.0 \times 10^{-8}$ g·cm/s·cmHg or less.

Another aspect is the apparatus for manufacturing an optical fiber preform, wherein the pipe having the water permeance factor of $1.0 \times 10^{-11}$ g·cm/cm2·s·cmHg or less is surrounded by an outer pipe space apart via a spacing.

Another aspect is the apparatus for manufacturing an optical fiber preform, wherein the outer pipe is a pipe having a water permeance factor of $1.0 \times 10^{-10}$ g·cm/cm²·s·cmHg or less.

The term "water permeance factor" according to the present invention is defined as a value represented by a product of a diffusion coefficient of water vapor to a pipe material and a solubility coefficient.

According to the method for manufacturing an optical fiber preform and the apparatus therefor of the present invention, the amount of water penetrating to a pipe that supplies a dehydrating agent to a dehydration apparatus is reduced, the amount of water present in the atmosphere during a hydrating treatment is reduced and it is possible to adequately remove water in the porous glass preform. Thus, a sufficient effect of dehydration is achieved and a porous glass preform containing a reduced amount of water can be obtained. Furthermore, as for the equipment construction, it is sufficient to use a simple modification of an apparatus without using an expensive apparatus. Furthermore, a complex operating control, which is time-consuming, is not required.

As a result, it is possible to reduce the transmission loss peak at a wavelength of 1385 nm caused by hydroxyl groups in a single-mode optical fiber, and optical fibers exhibiting desired propagation characteristics in a wavelength region between 1280 nm and 1600 nm, for example, can be manufactured easily in a stable manner.

BEST MODE FOR CARRYING OUT THE INVENTION

A detailed description of the present invention will be described.

As a dehydrating agent used for a dehydrating treatment, a compound selected from chlorine ($Cl_2$), fluorine ($F_2$), thionyl chloride ($SOCl_2$), carbon tetrachloride ($CCl_4$), and the like is employed, and these dehydrating agents are used together with a carrier gas containing an inert gas, such as helium (He) gas, argon (Ar) gas, and the like. Since these dehydrating agents are corrosive to metals, a pipe employing a synthetic resin is commonly used as piping for supplying the dehydrating agents.

However, since such piping is made of a synthetic resin, the piping has higher moisture permeability than metals, and traces of water penetrate from outside into the piping. The water then contaminates the dehydrating agent flowing within the piping, and a dehydrating treatment is performed using the dehydrating agent containing the traces of water, which may reduce the effect of dehydration.

The present inventors noticed the above facts and brought the present invention to completion.

Hereafter, embodiments of a method for manufacturing an optical fiber preform according to the present invention will be described with reference to the drawings.

Figure 1:
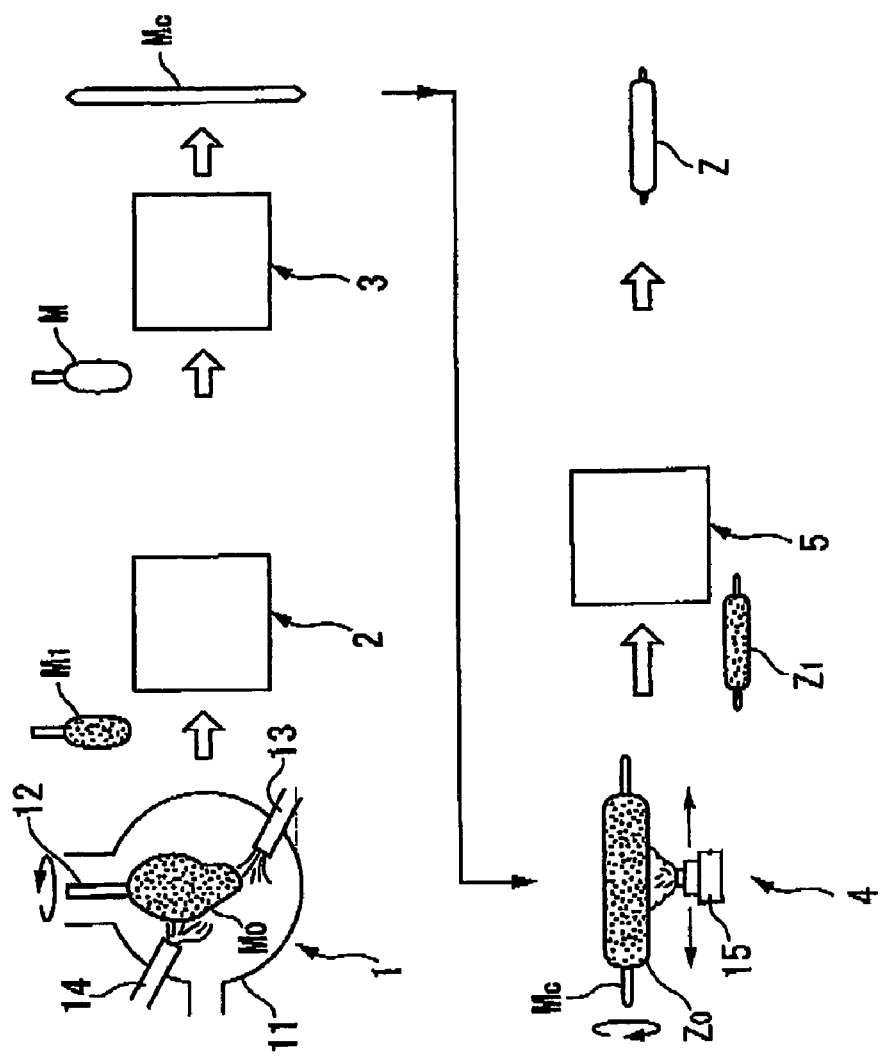
FIG. 1 is a process flow chart illustrating one example of a method for manufacturing an optical fiber preform.

FIG. 1 is a process flow chart illustrating one example of a method for manufacturing an optical fiber preform. Upon manufacturing an optical fiber preform Z, first, a core rod Mc is provided. Glass particles are then deposited on the outer periphery surface of the core rod Mc, and dehydration and baking are performed to obtain the optical fiber preform Z. The above process will be explained below.

[I] Fabrication of the Core Rod Mc

First, in a reaction vessel 11 of a core preform manufacturing apparatus 1 employing the VAD method, a glass material Mo for the core rod, such as silicon tetrachloride ($SiCl_4$) and germanium tetrachloride ($GeCl_4$), and the like, is reacted in a oxyhydrogen flame from a core burner 13 and a cladding burner 14 at an end of a seed rod 12 that can be rotated and drawn upward, and the resulting glass microparticles are deposited on the end to fabricate a porous core preform M1.

Then, the porous core preform M1 is subjected to a dehydrating treatment in a dehydration and baking status 2. By this, the porous core preform M1 is brought into contact with a dehydrating agent at a temperature of about 1200° C., in an atmosphere of a dehydrating agent carrier gas, such as argon gas, helium gas, or the like, containing a 0.1-10% volume of chlorine, fluorine, thionyl chloride, carbon tetrachloride, or the like (a 0.1-10% volume of oxygen may be added if necessary) for dehydrating the porous core preform M1, thereby reducing hydroxyl groups in the porous core preform M1.

Thereafter, the porous core preform M1 that has been subjected to the dehydrating treatment in the baking and dehydration treatment apparatus 2 is heated at temperature of between about 1400° C. and 1600° C. in a helium atmosphere (chlorine, fluorine, or the like is added if necessary) to perform a baking treatment to obtain a vitrified core preform M. Then, the vitrified core preform M is heated at between 1100° C. and 2000° C. in an atmosphere of an inert gas in a drawing apparatus 3 to draw and reduce the diameter of the core preform M, thereby obtaining a desired core rod Mc.

[II] Fabrication of the Optical Fiber Preform Z.

Thereafter, while the core rod Mc obtained in the above process steps is placed horizontally (or vertically) in an optical fiber preform manufacturing apparatus 4 and is rotated around the longitudinal axis, a glass source material gas, e.g., silicon tetrachloride ($SiCl_4$), or the like, is reacted in an oxyhydrogen flame from a burner 15 that is shifted along the longitudinal direction of the core rod Mc, and is evenly deposited in a form of glass microparticles Zo on the outer periphery surface of the core rod Mc to fabricate a porous optical fiber preform Z1.

Then, the porous optical fiber preform Z1 is heated at a temperature of between about 1400° C. and 1600° C. in a helium atmosphere (chlorine, fluorine, or the like is added if necessary) in a baking and dehydration treatment apparatus 5 to perform a baking treatment to obtain a vitrified optical fiber preform Z. At this time, a dehydrating treatment may be performed before the baking treatment as in the case of the fabrication of the core rod, if required.

The end portion of the thus obtained optical fiber preform Z is heated in a drawing apparatus at between about 1800° C. and 2200° C. in an atmosphere of an inert as to perform a drawing process, thereby obtaining a bare optical fiber having an outer dimer of 125 μm. An optical fiber having an outer diameter of, for example, 250 μm (this value may be changed if necessary) is obtained by applying a resin coating on the bare optical fiber.

In the method for manufacturing an optical fiber preform comprising each step described above, the present invention employs a pipe made of a material having a water permeance factor of $1.0 \times 10^{-11}$ g·cm/cm²·s·cmHg or less, or, for example, a pipe made of a material having a water permeance factor of $3.0 \times 10^{-12}$ g·cm/cm²·s·cmHg or less, for each pipe for supplying the dehydrating agent to respective baking and dehydration apparatuses 2 during the dehydrating treatment of the porous core preform $M_1$ and the porous optical fiber preform $Z_1$. This will be described with reference to an illustrative schematic diagram of the dehydration apparatus shown in FIG. 2.

Figure 2:
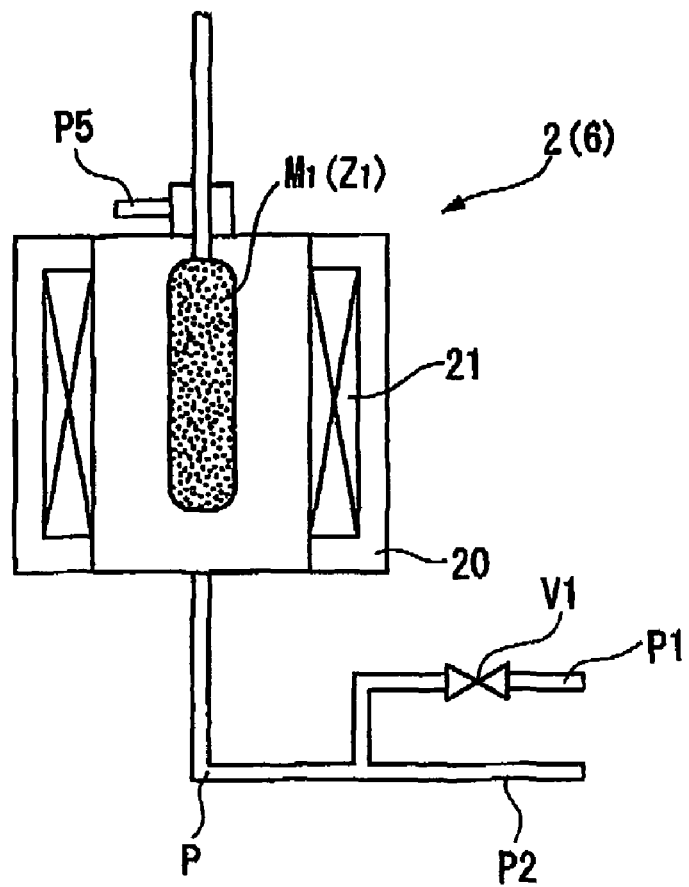
FIG. 2 is a schematic diagram illustrating an example of a baking and dehydrating apparatus according to the present invention.

In FIG. 2, the baking and dehydration apparatus 2 of the preset invention comprises an electric furnace 20 having an electric heater 21. A feeding pipe P1 for introducing the dehydrating agent is combined via a valve V1 to a pipe P2 in which an inert gas, such as helium, flows, and is combined to a main feeding pipe P together with the pipe P2, and the main feeding pipe P is connected to the electric furnace 20 such that the main feeding pipe P communicates with the electric furnace 20. The dehydrating agent feeding pipe P1 and the main feeding pipe P (for the sake of convenience, these pipes through which the dehydrating-agent flows may be collectively referred to as "Pd") employ a pipe made of a material having a water permeance factor of $1.0 \times 10^{-11}$ g·cm/cm²·s·cmHg or less, or, for example, a pipe having a water permeance factor of $3.0 \times 10^{-12}$ g·cm/cm²·s·cmHg or less.

As such a pipe material having such a water permeance factor, polytetrafluoroethylene and high density polyethylene are exemplary, and the thickness of the pipes is between about 0.5 mm and 1.5 mm in one example. Furthermore, a pipe that is applied with a coating of a corrosion-resistant resin, such as a fluorine resin, polyethylene, vinyl chloride resin, or the lie, inside the metal pipe, such as stainless steel as the pipe material, may be used.

Furthermore, in FIG. 2, a pipe P5 is a discharge pipe for discharge from the electric furnace 20 residual dehydrating agent or carrier gas that is left over after the reaction.

Next, the electric heater 21 is turned on to set the temperature inside the furnace 20 to about 1200° C. A mixture gas of a carrier gas, such as helium, and a dehydrating agent (oxygen may be added if necessary) is flowed through the feeding pipe P1 made of a material having the water permeance factor of $1.0 \times 10^{-11}$ g·cm/cm²·s·cmHg or less, and at the same time, an inert gas, e.g., helium gas, is flowed through the pipe P2. The two are merged at the main feeding pipe P and are supplied to the electric furnace 20.

The porous core preform M1 (or the porous optical fiber preform Z1) placed within the electric furnace 20 is exposed to the dehydrating agent at high temperatures, and hydroxyl groups therein are removed and reduced.

In this manner, since a feeding pipe is used which is made of a material having a low water permeance factor of $1.0 \times 10^{-11}$ g·cm/cm²·s·cmHg or less for supplying the dehydrating agent to the baking and dehydration apparatus, penetration of water from outside into the feeding pipe is reduced. Thus, the effect of removing hydroxyl groups from the porous core preform M1 (or the porous optical fiber preform Z1) is significantly improved, and an optical fiber preform having hydroxyl groups at a significantly low level can be obtained.

As a result, it is possible to reduce transmission loss at a wavelength of 1385 nm caused by hydroxyl groups in a single-mode optical fiber that is obtained from such an optical fiber preform. In addition, product having stable quality can be easily manufactured using an inexpensive apparatus without requiring additional expensive equipment or processing under complex manufacturing conditions.

Furthermore, a gas that is used as the carrier gas is preferably an inert gas having a dew point of –85° C. or less, more preferably –90° C. or less, such as, helium, argon, or the like.

In addition, installing respective pipes P1 and P for supplying the dehydrating agent in an atmosphere with a humidity of 40% or less, more preferably 25% or less further improves the effect of removing hydroxyl groups.

Furthermore, using as the inert gas to be supplied via the pipe P2 an inert gas having a dew point of –90° C. or less also further improves the effect of removing hydroxyl groups.

Figure 3:
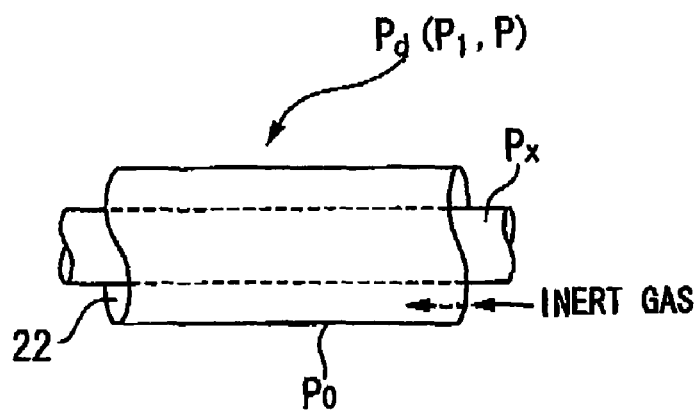
FIG. 3 is a schematic diagram illustrating another example of a feeding pipe of a dehydrating agent.

Furthermore, as another aspect of the main feeding pipe P1 and the pipe P2 for supplying the dehydrating agent, as shown in FIG. 3, a so-called "dual tube" comprising an inner pipe Px made of a material having a water permeance factor of $1.0 \times 10^{-11}$ g·cm/cm²·s·cmHg or less and an outer pipe Po that is provided outside the inner pipe Px and is spaced apart via a spacing 22 may be used, and a gas having a dew point of –80° C. or less, more preferably –85° C. or less may be flowed through the spacing 22. In this case, the gas having a dew point of –80° C. or less flowed through the spacing 22 may be a mixture gas of one or more gases selected from the group consisting of air, nitrogen, oxygen, carbon dioxide, argon, helium, and the like, for example.

EXAMPLES

As examples of the present invention, the following experiments were carried out in order to confirm the effects of the present invention.

Optical fibers were manufactured while varying parameters of the pipe P1 and P (for the sake of convenience, these pipes through which the dehydrating agent flows may be collectively referred to as "Pd"). The parameters include, (1) the material, (2) the humidity of the ambient environment in which the pipes are installed, (3) dew points of the carrier gas and the inert gas flowed though the pipes, (4) a single tube or a dual tube, and the like. Transmission losses (dB/km) of the optical fibers manufactured under the varied parameters were measured at a wavelength of 1385 nm to confirm the effects. It should be noted that optical characteristics other than the transmission loss at a wavelength of 1385 nm of each of the thus manufactured optical fibs were controlled so that they fell within certain ranges.

Example 1

A dehydrating agent was supplied to the baking and dehydration apparatus 2 using pipes made of materials having different water permeance factors as a feeding pipe Pd for the dehydrating agent to obtain optical fiber performs Z, which were drawn to obtain optical fibers (having an outer diameter of 125 μm). Transmission losses (dB/km) of the optical fibers at a wavelength of 1385 nm were measured. The feeding pipe Pd for the dehydrating agent employed had a length of 5 m and an outer diameter of 6.3 mm.

The obtained data is listed in Table 1.

TABLE 1

| Pipe Material | Water Permeance Factor of Pipe g · cm/cm² · s · cmHg × $10^{-12}$ | Loss at a Wavelength of 1385 nm dB/km |
|---|---|---|
| PTFE | 2.5 | 0.278 |
| Polyethylene | 6.5 | 0.291 |
| Polyvinyl chloride | 45 | 0.420 |
| Polystyrene | 95 | 0.592 |

PTFE: polytetrafluoroethylene

As is evident from Table 1, the transmission loss at a wavelength of 1385 nm sharply increased to 0.30 dB/km when pipes with a water permeance factor of $10 \times 10^{-12}$ g·cm/cm²·s·cmHg or higher were used. It was found that the transmission loss at a wavelength of 1385 nm remained at a low level of 0.30 dB/km or less when the pipes with a water permeance factor of $10 \times 10^{-12}$ g·cm/cm²·s·cmHg or less were used; in particular, the transmission loss remained at an extremely low level of 0.28 dB/km when a pipe with a water permeance factor of $3.0 \times 10^{-12}$ g·cm/cm²·s·cmHg or less was used.

From the results described above, it was confirmed that using a pipe having a water permeance factor of $1.0 \times 10^{-11}$ g·cm/cm²·s·cmHg or less, more preferably a pipe having a water permeance factor of $3.0 \times 10^{-12}$ g·cm/cm²·s·cmHg or less, is effective in reducing the transmission loss at a wavelength of 1385 nm upon supplying the dehydrating agent to the baking and dehydration apparatus 2.

Example 2

The water permeance factor and the surface area (which is associated with the length and the outer diameter) of a feeding pipe Pd for feeding a dehydrating agent, which made contact with the dehydrating agent, were considered. A dehydrating agent was supplied to the baking and dehydration apparatus 2 using pipes made of materials having different values of a product of water permeance factors and surface areas (by changing the length and the outer diameter) to obtain optical fiber preforms Z which were drawn to obtain optical fibers.

Transmission losses (dB/km) of the optical fibers at a wavelength of 1385 nm were measured.

The obtained data is listed in Table 2.

TABLE 2

| Water Permeance Factor of Pipe × Surface Area g · cm/s · cmHg × 10$^{-9}$ | Loss at a Wavelength of 1385 nm dB/km |
|---|---|
| 2.5 | 0.278 |
| 3.5 | 0.287 |
| 5.2 | 0.288 |
| 6.4 | 0.289 |
| 9.7 | 0.294 |
| 44 | 0.462 |
| 94 | 0.591 |

As is evident from Table 2, the transmission loss at a wavelength of 1385 nm sharply increased to 0.30 dB/km when pipes with a product of the water permeance factor and the surface area of 10×10$^{-9}$ g·cm/cm$^2$·s·cmHg or higher were used. In addition, it was found that the transmission loss at a wavelength of 1385 nm remained at a low level of 0.3 dB/km or less when the pipes having a product of the water permeance factor and the surface area of 10×10$^{-9}$ g·cm/cm$^2$·s·cmHg were used.

From the results described above, it was confirmed that supplying the dehydrating agent using a pipe having a product of the water permeance factor and the surface area of 1.0×10$^{-8}$ g·cm/cm$^2$·s·cmHg or less is effective In reducing the transmission loss at a wavelength of 1385 nm upon supplying the dehydrating agent to the baking and dehydration apparatus 2.

Example 3

The effect of the ambient environment in which the feeding pipe Pd for supplying the dehydrating agent to the baking and dehydration apparatus 2 is installed was confirmed, especially the difference in the humidity of the environment on the transmission losses at a wavelength of 1385 nm of optical fibers manufactured. A pipe having a water pace fir of 2.5×10$^{-12}$ g·cm/cm$^2$·s·cmHg, a length of 5 m, and an outer diameter of 6.3 mm was used as the feeding pipe Pd for the dehydrating agent. While changing the humidity in the room where the feeding pipe Pd for the dehydrating agent was stalled, optical fibers were manufactured using the baking and dehydration apparatus 2 having the feeding pipe Pd in each environment of varied humidity. Transmission losses (dB/km) of the optical fibers at a wavelength of 1385 nm were measured.

The obtained data is listed in Table 3

TABLE 3

| Humidity in Room where Pipe was Installed % | Loss at a Wavelength of 1385 nm dB/km |
|---|---|
| 19.5 | 0.276 |
| 24.8 | 0.276 |
| 27.0 | 0.277 |
| 35.4 | 0.283 |
| 40.1 | 0.285 |
| 45.7 | 0.290 |
| 58.3 | 0.293 |

As is evident from Table 3, it was found that, when the ambient humidity was 40% or higher, the transmission losses at a wavelength of 1385 nm of the manufactured optical fibers became a value of 0.29 dB/km or higher. Installing the pipe Pd in the environment where the humidity is 40% or less resulted in transmission losses of the manufactured optical fibers of a value of 0.29 dB/km or less, and especially the transmission loss was become a value of 0.28 dB/km or less when the humidity was 25% or less.

From the results described above, it was confirmed that supplying the dehydrating agent to the baking and dehydration apparatus 2 via the feeding pipe Pd that is installed in the environment where the humidity is 40% or less is effective in reducing the transmission loss at a wavelength of 1385 nm of the manufactured optical fibers, and furthermore, maintaining a humidity of 25% or less is more effective.

Example 4

The effect of the dew point of a carrier gas for carving the dehydrating agent to the baling and dehydration apparatus 2 on the transmission losses at a wavelength of 1385 nm of the manufactured optical fibers was confirmed. A pipe having a water permeance factor of 3.1×10$^{-12}$ g·cm/cm$^2$·s·cmHg, a length of 5 m, and an outer diameter of 6.3 mm was used as the feeding pipe Pd for the dehydrating agent. Through this pipe Pd, the dehydrating agent was supplied accompanied by a carrier gas containing helium gas to the dehydration apparatus 2 and the dehydration apparatus 6, and optical fibers were manufactured while varying the dew point of the carrier gas. Transmission losses (dB/km) of the optical fibers that were manufactured while supplying the dehydrating agent carried by the different carrier gases having different dew points at a wavelength of 1385 nm were measured.

The obtained data is listed in Table 4.

TABLE 4

| Dew Point of Carrier Gas of Dehydrating Agent ° C. | Loss at a Wavelength of 1385 nm dB/km |
|---|---|
| −96 | 0.272 |
| −94 | 0.278 |
| −88 | 0.284 |
| −85 | 0.297 |
| −79 | 0.306 |
| −67 | 0.315 |
| −52 | 0.321 |

As is evident from Table 4, it was found that the value of the mission losses of the manufactured optical fibers was 0.30 dB/km or higher when the dew point of the carrier gas was −85° C. or higher. Dew points of −85° C. or less reduced the transmission losses of the manufactured optical fibers to a value of 0.30 dB/km or less, and dew points of −90° C. or less further reduced the transmission losses to a value of 0.28 dB/km or less.

From the results described above, it was confirmed that maintaining the dew point of the carrier gas used for supplying the dehydrating agent to the baking and dehydration apparatus 2 to −85° C. or less, more preferably −90° C. or less, is effective in reducing the transmission losses at a wavelength of 1385 nm of the manufactured optical fibers.

Example 5

The effect of the dew point of a carrier gas supplied through the pipe P2, which was the main component of the gas supplied to the baking and dehydration apparatus 2, on the transmission losses at a wavelength of 1385 nm of the manufactured optical fibers was confirmed.

A pipe having a water permeance factor of $3.1 \times 10^{-12}$ g·cm/cm²·s·cmHg, a length of 5 m, and an outer diameter of 6.3 mm was used as the feeding pipe Pd for the dehydrating agent, and helium having a dew point of −97° C. was used as a carrier gas. Optical fibers were manufactured while varying the dew point of helium gas supplied through the pipe P2.

Transmission losses (dB/km) of the optical fibers that were manufactured while feeding helium gas having different dew points at a wavelength of 1385 nm we measured.

The results are listed in Table 5.

TABLE 5

| Dew Point of Helium Gas ° C. | Loss at a Wavelength of 1385 nm dB/km |
|---|---|
| −98 | 0.271 |
| −91 | 0.298 |
| −85 | 0.319 |
| −79 | 0.402 |
| −70 | 0.525 |
| −66 | 1.163 |
| −52 | >10 |

As is evident from Table 5, it was found that the transmission losses of the manufactured optical fibers were increased to 0.30 dB/km or higher when the dew point of helium gas was −90° C. or higher. Dew points of −85° C. or less reduced the transmission losses of the manufactured optical fibers to a value of 0.30 dB/km or less, and dew points of −95° C. or less further reduced the transmission losses to a value of 0.28 dB/km or less.

From the results described above, it was confirmed that maintaining the dew point of the carrier gas used as a carrier gas supplied to the baling and dehydration apparatus 2 to −90° C. or less, preferably −95° C. or less, is effective in reducing the transmission losses of the manufactured optical fibers.

Example 6

The effect of the following was confirmed: constructing the feeding pipe Pd for supplying the dehydrating agent to the baking and dehydration apparatus 2 as a so-called "dual tube" that comprises an id pipe Px made of a material having a water permeance actor of $1.0 \times 10^{-11}$ g·cm/cm²·s·cmHg or less and an outer pipe Po surrounding the inner pipe Px provided spaced apart via the spacing 22, and feeding a gas having a dew point of −80° C. or less through the spacing 22.

The verification was performed by constructing a dual tube pipe (see FIG. 3) that comprised a pipe having a water permeance factor of $3.1 \times 10^{-12}$ g·cm/cm²·s·cmHg, a length of 5 m, and an outer diameter 6.3 mm as the inner pipe Px and a outer pipe Po made of a vinyl chloride resin provided spaced apart via a spacing, and feeding nitrogen gas having a dew point of −88° C. through the spacing 22, which was supplied to the baking and dehydration apparatus 2. Optical fibers were manufactured under the above condition, and the transmission losses thereof were measured.

This result was compared with results of the transmission losses of optical fibers that were manufactured when the dehydrating agent was supplied to the baking and dehydration apparatus 2 through a single tube pipe that similarly had a water permeance factor of $3.1 \times 10^{-12}$ g·cm/cm²·s·cmHg, a length of 5 m, and an outer diameter 6.3 mm.

The obtained data is listed in Table 6.

TABLE 6

| Outer Pipe | Loss at a Wavelength of 1385 nm dB/km (Average Value) |
|---|---|
| Present | 0.273 |
| Absent | 0.278 |

As is evident from Table 6, when the dehydrating agent was supplied to the baking and dehydration apparatus 2 though the dual tube in which the outer pipe Po was provided surrounding the inner pipe Px provided spaced apart via the spacing and in which nitrogen gas having a dew point of −88° C. was supplied through the spacing the transmission losses of the manufactured optical fibers were about 0.273 dB/km on average. This was smaller than the transmission loss of about 0.278 dB/km on average when the dehydrating agent was supplied to the baking and dehydration apparatus 2 though the single tube having only the inner pipe Px without providing the outer pipe Po. Thus, it was conformed that the dual piping is effective in educing the transmission losses. While exemplary embodiments of the invention have been described and illustrated above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

INDUSTRIAL APPLICABILITY

According to the present invention, an optical fiber preform having a significantly reduced amount of hydroxyl groups can be obtained, and an optical fiber exhibiting very low transmission loss in the wavelength vicinity of 1385 nm that is caused by hydroxyl groups can be manufactured.

The invention claimed is:

1. A method for manufacturing an optical fiber preform, comprising:
   providing a porous glass preform obtained by a vapor-phase deposition method; and
   performing a dehydrating treatment using a dehydrating agent,
   wherein the dehydrating treatment is performed using the dehydrating agent supplied through a pipe made of a synthetic resin and having a water permeance factor of $1.0 \times 10^{-11}$ g·cm/cm²·s·cmHg or less at 40° C., and
   an outside of the pipe through which the dehydrating agent flows is surrounded by a spacing, and a gas having a dew point of −80° C. or less is flowed through the spacing.

2. The method for manufacturing an optical fiber preform as recited in claim 1, wherein the dehydrating agent is supplied together with a carrier gas having a dew point of −85° C. or less.

3. The method for manufacturing an optical fiber preform as recited in claim 2, wherein an inert gas having a dew point of −90° C. or less is further supplied.

4. The method for manufacturing an optical fiber preform as recited in claim 1, wherein the gas having a dew point of −80° C. or less that is flowed through the spacing is a gas containing at least one gas selected from the group consisting of air, nitrogen, oxygen, carbon dioxide, argon, and helium.

5. The method for manufacturing an optical fiber preform as recited in claim 1, wherein the dehydrating agent used for the dehydrating treatment is a compound selected from the group consisting of chlorine, fluorine, thionyl chloride, and carbon tetrachloride.

6. The method for manufacturing an optical fiber preform as recited in claim 1, wherein the porous core preform is formed by reacting a glass material in a burner to deposit glass microparticles thereon.

7. The method for manufacturing an optical fiber preform as recited in claim 6, wherein the glass material comprises silicon tetrachloride and germanium tetrachloride.

8. The method for manufacturing an optical fiber preform as recited in claim 1, wherein the pipe has a water permeance factor of $3.0 \times 10^{-12}$ g·cm/cm$^2$·s·cmHg or less.

9. The method for manufacturing an optical fiber preform as recited in claim 1, wherein the pipe comprises a material selected from the group consisting of polytetrafluoroethylene, and high density polyethylene.

10. The method for manufacturing an optical fiber preform as recited in claim 1, wherein the dehydrating agent is supplied in an atmosphere with a humidity of 40% or less.

11. The method for manufacturing an optical fiber preform as recited in claim 1, wherein ambient humidity where the pipe is present is maintained at 40% or less.

12. The method for manufacturing an optical fiber preform as recited in claim 1, wherein the pipe has a thickness between about 0.5 and 1.5 mm, inclusive.

13. The method for manufacturing an optical fiber preform as recited in claim 1, wherein a product of the water permeance factor of the pipe and a surface area of the pipe is maintained at $1.0 \times 10^{-8}$ g·cm/s·cmHg or less.

* * * * *